J. PRICE.
Corn-Planter.

No. 29,100.

Patented July 10, 1860.

Witnesses:
W. S. Clary
Daniel Breed

Inventor
John Price

UNITED STATES PATENT OFFICE.

JOHN PRICE, OF HARRISON, OHIO.

IMPROVEMENT IN CORN-PLANTERS.

Specification forming part of Letters Patent No. 29,100, dated July 10, 1860.

*To all whom it may concern:*

Be it known that I, JOHN PRICE, of Harrison, in the county of Carroll and State of Ohio, have invented a new and useful Improvement in Check-Row Corn-Planters; and I do hereby declare that the following is a full and exact description thereof, reference being had to the accompanying drawings, and to the letters of reference marked thereon.

Many different forms of check-row corn-planters have been constructed, but all have been found in practice to be more or less defective in some important feature.

The object of my invention is to make a more perfect machine than any heretofore constructed.

My improvement relates chiefly to the arrangement for elevating the markers, coverers, and rollers, and to the arrangements for dropping the seed.

Figure 1:
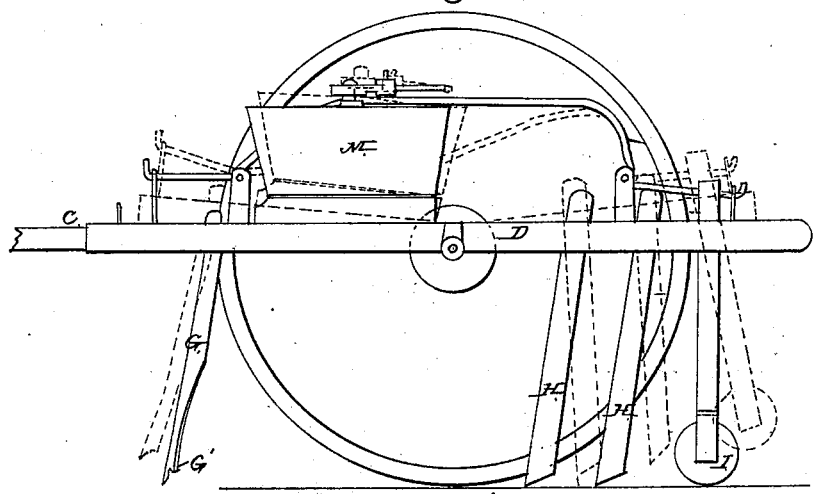
Figure 2:
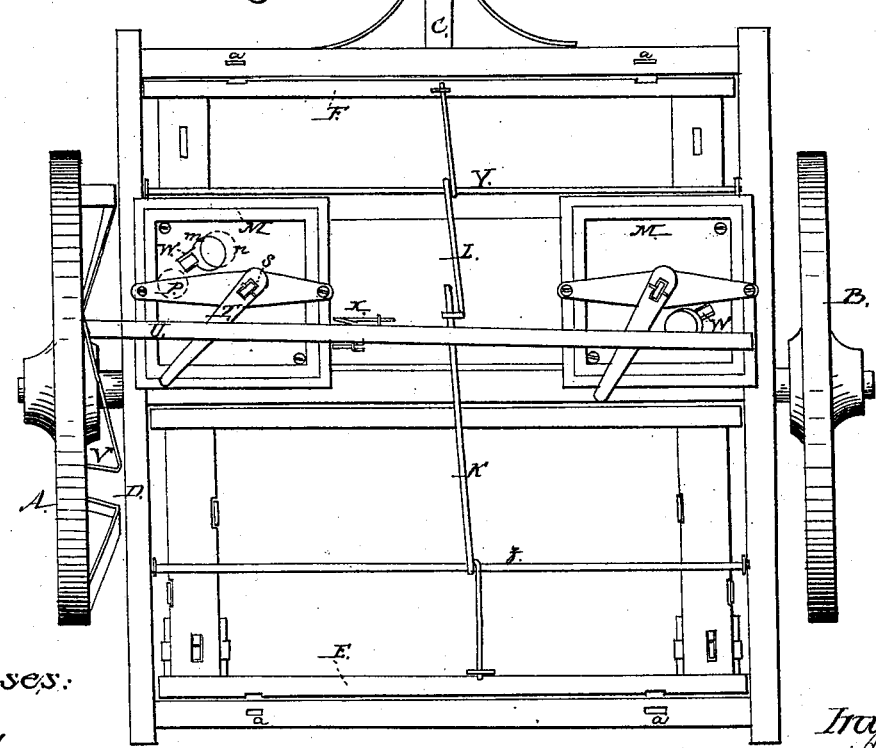

In the accompanying drawings, Figure 1 is a side view of my improved check-row corn-planter. Fig. 2 is a top view of the same.

The machine travels upon two wheels, A and B, and is drawn in the usual manner by the team-shaft C. The main frame D rests upon the axle, and is rigidly connected with the team-shaft. Two smaller frames, E and F, are hinged to the main frame near the axle, so as to be elevated or depressed at pleasure. One of these frames, F, carries two shovels or markers, G, and the other frame, E, carries four coverers, H, and two rollers, I. These shovels G being near the forward part of the machine, while the coverers and rollers are considerable distance behind the axle, the machine moves very steadily, not being easily disturbed by clods or other obstacles. The shovels or markers, the coverers, and the rollers are all made adjustable in the frames E and F in order to plant at any desirable depth. These frames can also be elevated at pleasure, as shown in red lines in Fig. 1, so as to throw the markers and the coverers out of the ground in passing stones or other obstructions, or for transporting the machine from field to field. This elevation is produced by means of the levers K and L, operated by the foot of the driver, who sits between the two seed-boxes M. Two rods, Z and Y, serve as fulcra for the levers. The seed-boxes are provided with a peculiar arrangement for dropping the corn.

A bar, U, moved in one direction by cams V, (on one of the traveling wheels,) and in the opposite direction by a coiled spring, X, is connected with arms T, so as to rock the shafts S back and forth; and attached to these shafts S are two other arms working under the bottom of the seed-boxes M, and containing seed-cups n. (Shown partly in dotted lines, Fig. 2.) The corn falls through holes m in the seed-boxes, and thus fills the seed-cups n. Below these seed-cups is a second bottom, which prevents the corn from falling through the seed-cups until said cups are swung under the spring W by the rock-shafts S, when the corn falls through a hole, P, in the second bottom of the seed-box. The spring extends a considerable distance under the bottom board of the seed-box, and is so attached as to yield to a kernel of corn caught between said spring and the edge of the seed-cup. It serves to regulate the amount of corn carried forward by the seed-cup by striking off the kernels so as to leave the cup just full; but in case a kernel is caught by the spring the kernel is not broken and lost, but is allowed to pass the spring, and thus plant an extra kernel. The shovels or markers G are provided with wings G', which sweep away clods or other substances which might otherwise interfere with the planting.

I do not broadly claim the use of cams upon the wheels for operating the seed-cups, but confine my second claim to the peculiar arrangement and combination of devices above set forth for that purpose.

Having thus described my invention, what I claim, and desire to secure by Letters Patent of the United States, is—

1. The arrangement of the hinged frames E and F, in combination with the main frame, the levers K and L, the shovels G, coverers H, and rollers I, the whole being arranged and operated substantially as set forth, for the purposes described.

2. The combination of the bar U, cams V, spring Z, arms T, shafts S, and seed-cups n, arranged substantially as set forth, for the purpose specified.

JOHN PRICE.

Witnesses:
 DANIEL BREED,
 N. S. CLARY.